Jan. 10, 1939. M. W. HUBER 2,143,270
STRAINER
Filed Aug. 13, 1936 2 Sheets-Sheet 2
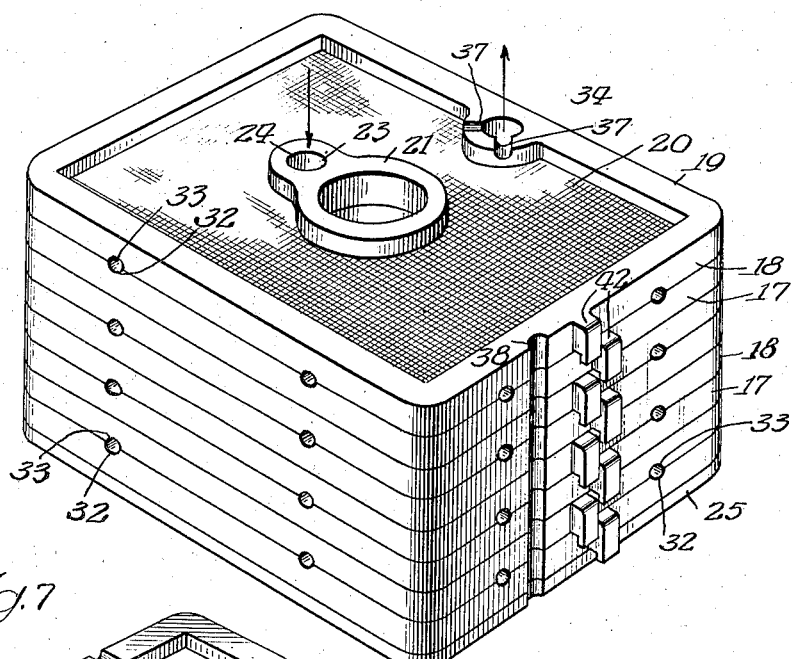
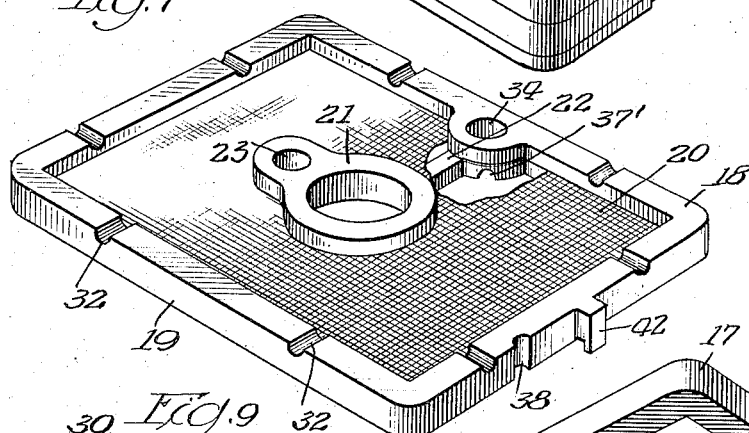
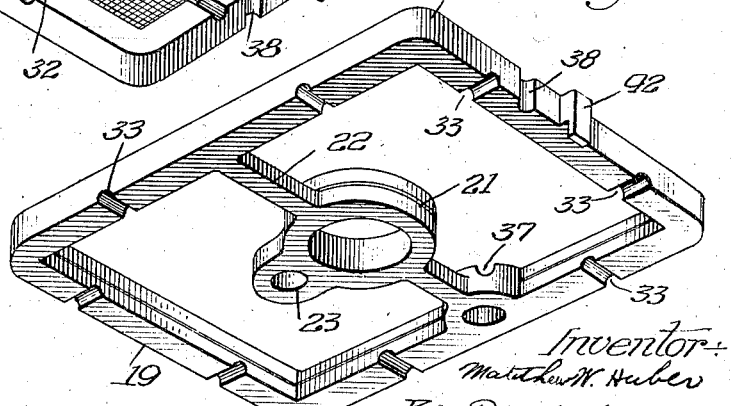
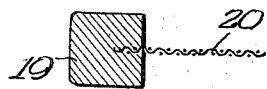
Inventor:
Matthew W. Huber
By Fred Gerlach
his Atty.

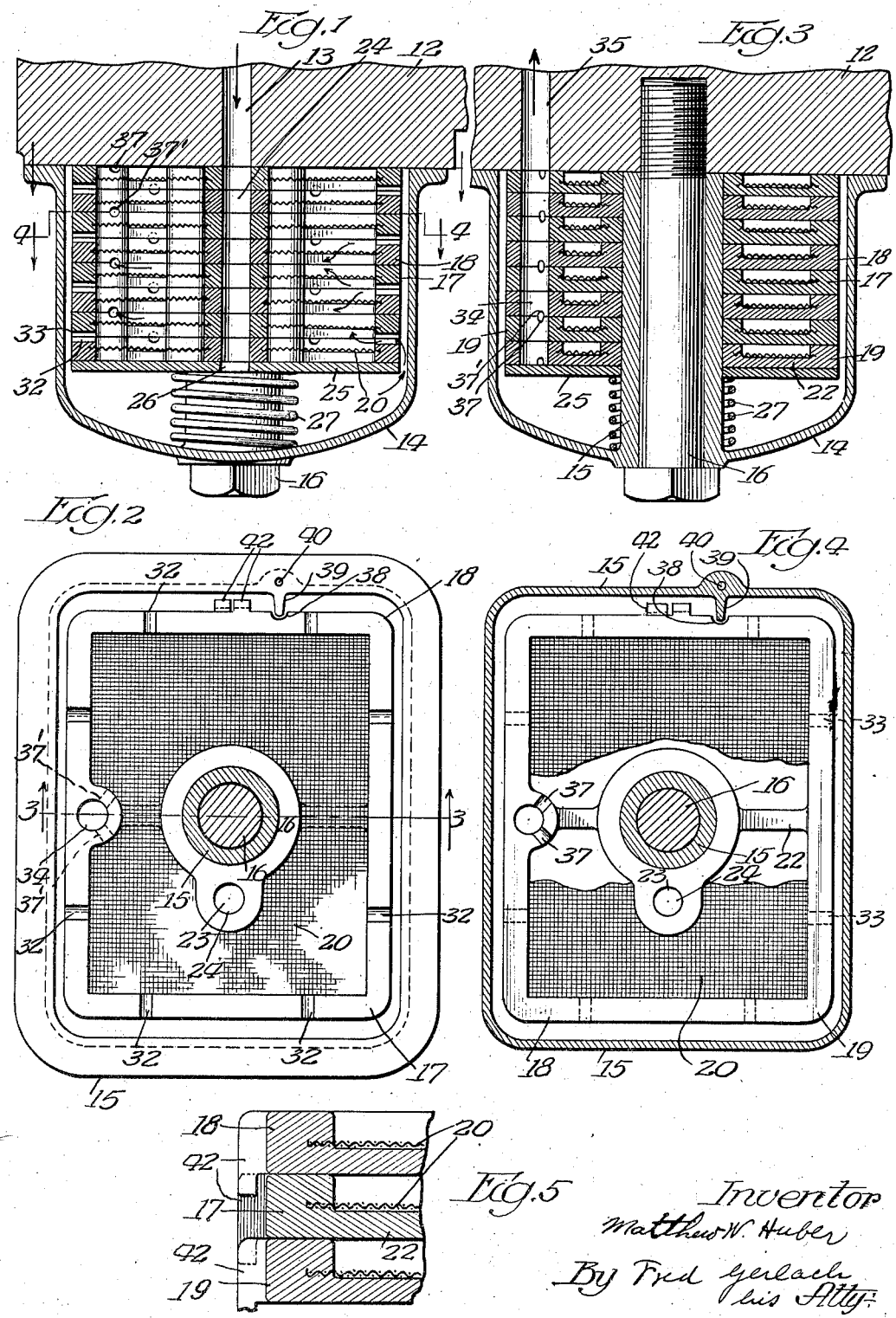

Patented Jan. 10, 1939

2,143,270

UNITED STATES PATENT OFFICE 2,143,270

STRAINER

Matthew W. Huber, Chicago, Ill., assignor to Tuthill Pump Company, Chicago, Ill., a corporation of Illinois Application August 13, 1936, Serial No. 95,796

7 Claims. (Cl. 210—178)

The invention relates to strainers and more particularly to that type of strainer which comprises a series of superposed screen-frames.

The objects of the invention are to provide a strainer which is compact in construction with a maximum capacity for the space used; which is composed of a series of screen-frames and may be decreased or increased at will to vary its capacity; which is composed of a series of screen-frames having grooves in their abutting faces forming inlet and outlet ducts which can be readily cleaned which is composed of frames with screens which are assembled without soldering; which is built up to the desired capacity with mating pairs of frames, with provision for preventing the incorrect assembling of the frames; and which can be produced at a low cost. Other objects of the invention will apear from the detail description.

The invention consists in the several novel features which are hereinafter set forth and are more particularly defined by claims at the conclusion hereof.

In the drawings: Fig. 1 is a vertical section showing a strainer embodying the invention applied to a pump-casing, the section being taken through the inlet ports of the screen sections. Fig. 2 is a plan view showing the strainer removed from the pump-casing. Fig. 3 is a section on the line 3—3 of Fig. 2. Fig. 4 is a horizontal section on the line 4—4 of Fig. 1. Fig. 5 is an enlarged fragmentary sectional view through several of the screen-frames. Fig. 6 is a perspective of an assembled group of screen-frames and the bottom plate. Figs. 7 and 8 are perspectives of a mating pair of screen-frames. Figs. 9 and 10 are details illustrating the manner of uniting the screen-cloth to the screen-frames.

The strainer which is shown in the drawings constitutes the preferred embodiment of the invention. It comprises a casing 14 and is illustrated in connection with a fuel oil pump which includes a housing 12. The latter has a flat bottom face against which the strainer casing fits, and embodies a vertical duct 13 through which oil enters the casing 14. It also embodies a vertical duct 35 whereby the strained oil is delivered back to the pump. The casing 14 has an open top and comprises side-walls, a bottom wall, and a housing engaging flange around the upper portions of the side walls. It also comprises an upstanding central cylindrical sleeve 15. A screw-bolt 16 extends through the sleeve 15 and is threaded into the pump-housing 14 to secure removably the strainer-casing against the pump-housing.

In addition to the casing 14 the strainer comprises a series of complementary pairs of mating screen-sections 17 and 18, superimposed upon and abutting adjacent one another. Any desired number of these sections may be assembled in the casing 14 to give the strainer the requisite capacity for its particular use. Each of these screen-sections is built up of a substantially rectangular cast-frame 19 and a screen 20 usually of woven wire, which extends across the frame midway between the upper and lower faces of the frame. Each frame has an integral central ring 21 supported by integral ribs 22 which extend inwardly from the sides of the frame. The rings 21 fit around the sleeve 15 in the strainer-casing. At one side of each ring 20 there is provided a vertical cylindrical port 23 to form a continuous vertical inlet duct 24, which registers with the duct 13 in the pump-housing. The upper and lower faces of frames 17 and 18 have finished faces so the frames will fit tightly on top of one another. The lower-most frame of the assembled series is closed by a bottom plate 25, the margin of which conforms to the screen-frames. This bottom plate 25 has an opening to fit around the sleeve 15 and an opening 26 registering with the vertical intake duct 24 to permit the oil to be strained to pass through the screen-frames from duct 13 to the bottom portion of the strainer-casing 14. A spring 27 around the sleeve 15 is interposed between the bottom of the casing 14 and the underside of the bottom-plate 25 and serves to press said plate upwardly with sufficient force to force the abutting faces of all of the screen-frames into tight contact to prevent liquid from flowing between said faces, except where grooves are provided for that purpose. In fabricating the screen-sections, the several parts of each screen-frame are formed with an angular recess 29, as shown in Fig. 9, and with an excess of upstanding metal 30 which is swaged or pressed downwardly and inwardly to lap the portion of the screen-cloth which rests on the bottom of said recess and to provide a substantially plane or flat face on the top of the frame. This exemplifies an inexpensive and efficient method of building up the screen-sections of frames and screen-cloth without requiring any soldering or braising, and so the screen-sections will not be damaged or buckled while they are being cleaned.

Each screen-frame is provided in one of its sides with a vertical port 34 which forms, when the screen-sections are assembled, a continuous vertical outlet duct through the screen-sections and leads to the duct 35 in the pump-housing.

In assembling the strainer while it is removed from the pump-casing, the bottom-plate and screen-frames are slid downwards on the sleeve 15, the bottom-plate 25 being positioned beneath the lowermost screen-section. When the strainer-casing is drawn upwardly by bolt 16 toward the pump-casing, the spring 27 will be compressed and subject the screen-sections and plate 25 to sufficient pressure to form tight joints between their abutting faces. When the casing is removed from the pump-housing the screen-sections may be readily slipped off the sleeve 15 and separated so that both faces and the grooves therein may be easily cleaned.

The abutting faces between alternate screen-frames 17, 18 are formed with mating semi-circular grooves 32, 33, to form ducts for delivering liquid or oil from the chamber in the strainer-casing 14 into the spaces between the screens. The abutting faces of the frames which alternate with the faces provided with grooves 32 and 33, are provided with semicylindrical mating ducts 37, 37' to deliver the oil or liquid into the outlet duct 34 after the oil has passed through one or more of the screens. This alternate formation of the grooves makes it necessary for the oil to pass through the screens before reaching the outlet. Each screen-frame is provided with a vertical notch 38 in one of its end-faces to register with a vertical rib 39 integrally formed with the strainer-casing. When the screen-sections are assembled correctly, notches 38 are vertically aligned to register with, and receive, the rib 39. These notches, in assembling the strainer, must be positioned in registry with the rib 39 in order to permit the assembly of the sections, so that the screen-frames can be placed in the casing only in their correct horizontal position in the casing, and so that ports 34 and ports 23 will be aligned to form continuous ducts in alignment with the ducts 35 and 13 respectively. A dowel-pin 40 projects upwardly from the top-face of the strainer-casing and is adapted to enter a corresponding hole in the pump-housing 12 correctly to position the strainer-housing and strainer-sections below the pump-housing, so that the vertical inlet and outlet ports passing through the strainer sections will be in registry with the ducts 13 and 35 in the pump-housing. Each screen-frame is also provided at one end with a projecting and depending lug 42. The lugs 42 on the alternating sections 17 and 18 are offset on opposite sides of the longitudinal center of the frame, so that if attempt is made to assemble one of the sections in an inverted position the lug 42 on the contiguous frame would interfere with the coming together of the contiguous frames and thus prevent improper assembling of the sections.

The invention exemplifies a strainer comprising a series of screen-sections with grooves in the abutting faces of the screen-frames forming ducts leading to and from the screen-cloths through which the liquid must pass. The arrangement and design of the screen sections makes it possible thoroughly and easily to clean the ducts when the frames are removed from the casing. The capacity of the strainer may be decreased or increased at will by increasing or varying the number of complementary pairs of screen-sections. The strainer as a whole is compact with maximum capacity for the amount of space required. The necessity of soldering the screen-cloth in the frames is eliminated and both sides of the screen are readily accessible for cleaning.

Whereas the strainer has been described in connection with a fuel pump it is to be understood that it may be used in other capacities and with liquid other than oil. It is also to be understood that the invention is not to be restricted to the details set forth, since these may be modified within the scope of the appended claims, without departing from the spirit and scope of the invention.

Having thus described the invention, what I claim as new and desire to secure by Letters Patent is:

1. A strainer comprising in combination, a series of abutting screen-sections comprising each a comparatively thick open type frame and a screen extending across and positioned substantially midway between the side faces of the frame, and having the spaces on opposite sides of each screen coacting with the spaces on opposite sides of the adjoining screens to form a series of full width chambers between the screens, said screen-sections also having mating pairs of grooves in every other pair of abutting side faces of the frames forming liquid conducting ducts leading to every other chamber, and mating grooves in the alternate pairs of abutting side faces of the frames forming liquid discharging ducts communicating with the alternate chambers, and means for clamping the screen sections together.

2. A strainer comprising in combination, a series of abutting screen-sections comprising each a comparatively thick open type frame and a screen extending across and positioned substantially midway between the side faces of the frame and having the spaces on the opposite sides of each screen coacting with the spaces on opposite sides of the adjoining screens to form a series of full width chambers between the screens, said screen sections also having aligned holes in the frames thereof forming an outlet duct and in addition mating pairs of grooves in every other pair of abutting side faces of the frames forming ducts for introducing liquid into every other chamber for passage through the screens into the alternate chambers and pairs of mating grooves in the alternate pairs of abutting side faces of the frames forming discharge ducts for the strained liquid leading from the alternate chambers to the hole formed outlet duct, and means for clamping the screen-sections together.

3. A strainer comprising in combination, a series of abutting screen-sections comprising each a comparatively thick open type frame and a screen extending across and positioned substantially midway between the side faces of the frame, and having the spaces on opposite sides of each screen coacting with the spaces on opposite sides of the adjoining screens to form a series of full width chambers between the screens, said screen-sections also having mating pairs of grooves in every other pair of abutting side faces of the frames forming ducts for introducing liquid into every other chamber for passage through the screens into the alternate chambers, and pairs of mating grooves in the alternate pairs of abutting side faces of the frames forming ducts for permitting discharge of the strained liquid from said alternate chambers, means for clamping the screen-sections together, aligned lugs connected to and disposed outwardly of the outer portions of alternate frames and projecting laterally with respect to the screen sections into lapped relation with the outer faces of the other frames, and similarly designed aligned lugs on the outer portions of said other frames arranged in offset relation with the first mentioned lugs and coacting with the latter to prevent assemblage of the screen sections with any one thereof in reversed relation with respect to the others.

4. A strainer comprising in combination, a casing, a series of abutting screen-sections in the casing each comprising a comparatively thick open type frame and a screen extending across and positioned substantially midway between the side faces of the frame, and having the spaces on opposite sides of each screen coacting with the spaces on opposite sides of the adjoining screens to form a series of full width chambers between the screens, said screens also having mating pairs of grooves in every other pair of abutting side faces of the frames forming ducts for introducing liquid into every other chamber for passage through the screens into the alternate chamber and pairs of mating grooves in the alternate pairs of abutting side faces of the frames forming discharge ducts for permitting discharge of the strained liquid from said alternate chambers, means for clamping the sections together, and means including interfitting means between the casing and the sides of the frames for holding the screen-sections against relative sidewise displacement in the casing.

5. A strainer comprising in combination, a casing, a series of abutting screen-sections in the casing each comprising a comparatively thick open type frame and a screen extending across and positioned substantially midway between the side faces of the frame, and having the spaces on opposite sides of each screen coacting with the spaces on opposite sides of the adjoining screens to form a series of full width chambers between the screens, said screens also having mating pairs of grooves in every other pair of abutting side faces of the frames forming ducts for introducing liquid into every other chamber for passage through the screens into the alternate chamber and pairs of mating grooves in the alternate pairs of abutting side faces of the frames forming discharge ducts for permitting discharge of the strained liquid from said alternate chambers, means for clamping the sections together, aligned lugs formed integrally with and disposed outwardly of the outer portion of alternate frames and projecting laterally with respect to the screen sections into lapped relation with the outer faces of the other frames, aligned outwardly and laterally projecting lugs on the other frames arranged in offset relation with the first mentioned lugs and coacting with the latter to prevent assemblage of the screen sections with any one thereof in reversed relation with respect to the other, and means including interfitting means between the casing and the sides of the frames for holding the screen-sections against relative sidewise displacement in the casing.

6. A strainer comprising in combination, a casing provided with a central post extending therethrough, a series of abutting screen sections in the casing comprising each a comparatively thick open type frame with a rib supported central portion and a screen extending between the frame sides and said portion and positioned substantially midway between the side faces of the frame, and having the spaces on opposite sides of each screen coacting with the spaces on opposite sides of the adjoining screens to form a series of full width chambers between the screens, said screen sections also having aligned holes in the central rib supported portions of the frames for the post and aligned holes at one side of the post receiving holes forming a duct for introducing liquid under pressure into the casing, and having in addition mating pairs of grooves in every other pair of abutting side faces of the frames forming ducts for conducting liquid from the casing into every other chamber for passage through the screens into the alternate chambers, means forming ducts for permitting discharge of the strained liquid from said alternate chambers, and means for clamping the sections together.

7. A strainer comprising in combination, a casing provided with a central post extending therethrough, a series of abutting screen sections in the casing comprising each a comparatively thick open type frame with a rib supported central portion and a screen extending between the frame sides and said portion and positioned substantially midway between the side faces of the frame, and having the spaces on opposite sides of each screen coacting with the spaces on opposite sides of the adjoining screens to form a series of full width chambers between the screens, said screen sections also having aligned holes in the central rib supported portions of the frames for the post and aligned holes at one side of the post receiving holes forming a duct for introducing liquid under pressure into the casing, and having in addition mating pairs of grooves in every other pair of abutting side faces of the frames forming ducts for conducting liquid from the casing into every other chamber for passage through the screens into the alternate chambers, means forming ducts for permitting discharge of the strained liquid from said alternate chambers, means for clamping the sections together, and interfitting means between the casing and the side portions of the frames for preventing the screen-sections from being rotatably displaced.

MATTHEW W. HUBER.